United States Patent
Shoham et al.

(10) Patent No.: US 12,500,858 B2
(45) Date of Patent: *Dec. 16, 2025

(54) AUTOMATICALLY INCREMENTED READ-WATERMARK

(71) Applicant: Snap Inc., Santa Monica, CA (US)

(72) Inventors: Haim Shoham, Berkeley, CA (US); Gavin Shriver, Seattle, WA (US); Jason Varbedian, Seattle, WA (US); Zhichao Yang, Kirkland, WA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/940,030

(22) Filed: Nov. 7, 2024

(65) Prior Publication Data

US 2025/0133050 A1    Apr. 24, 2025

Related U.S. Application Data

(63) Continuation of application No. 18/110,859, filed on Feb. 16, 2023, now Pat. No. 12,166,737.

(Continued)

(51) Int. Cl.
*H04L 51/216* (2022.01)
*G06F 16/955* (2019.01)
(Continued)

(52) U.S. Cl.
CPC .......... *H04L 51/216* (2022.05); *G06F 16/955* (2019.01); *H04L 51/043* (2013.01); *H04L 51/234* (2022.05)

(58) Field of Classification Search
CPC ..... H04L 67/02; H04L 51/046; H04L 67/306; H04L 51/52; H04L 51/043; H04L 51/04;
(Continued)

(56) References Cited

U.S. PATENT DOCUMENTS 6,704,737 B1 * 3/2004 Nixon ..................... G06F 16/27
707/999.102
6,848,107 B1 * 1/2005 Komine .................. G06F 9/546
718/103

(Continued)

OTHER PUBLICATIONS

"U.S. Appl. No. 18/110,859, Non Final Office Action mailed May 10, 2024", 17 pgs.

(Continued)

*Primary Examiner* — Ninos Donabed
(74) *Attorney, Agent, or Firm* — Schwegman Lundberg & Woessner, P.A.

(57) ABSTRACT

A system to automatically increment read-watermarks based on a set of predefined rules and criteria and configured to perform operations that include: accessing a message thread that comprises a plurality of messages; detecting a display of a message from among the plurality of messages at a client device, the message corresponding with an identification number from among a plurality of sequentially assigned identification numbers associated with the plurality of messages; applying the identification number that corresponds with the message from among the plurality of messages to a data object within a database associated with the message thread, the data object indicating a most recent message read by a user of the client device based on the identification number; detecting a trigger event; and automatically incrementing the identification number associated with the data object within the database responsive to the trigger event.

17 Claims, 9 Drawing Sheets

Related U.S. Application Data

(60) Provisional application No. 63/349,848, filed on Jun. 7, 2022.

(51) Int. Cl.
  *H04L 51/043* (2022.01)
  *H04L 51/234* (2022.01)

(58) Field of Classification Search
  CPC ... H04L 51/234; H04L 51/216; G06Q 10/107; G06F 16/955
  See application file for complete search history.

(56) References Cited

U.S. PATENT DOCUMENTS

| | | | |
|---|---|---|---|
| 7,506,263 B1* | 3/2009 | Johnston | G06Q 10/107 |
| | | | 715/752 |
| 7,620,407 B1* | 11/2009 | Donald | H04L 51/58 |
| | | | 709/206 |
| 8,935,707 B2* | 1/2015 | Falco | G06F 9/546 |
| | | | 710/22 |
| 10,206,072 B1* | 2/2019 | Yalamanchili | H04L 65/1104 |
| 10,459,778 B1* | 10/2019 | Parkinson | G06F 9/546 |
| 10,764,221 B1* | 9/2020 | Dalonzo | H04L 51/52 |
| 11,086,916 B2* | 8/2021 | Zhao | G06F 16/338 |
| 11,201,843 B1* | 12/2021 | Agarwal | H04L 51/42 |
| 12,166,737 B2 | 12/2024 | Shoham et al. | |
| 2003/0004952 A1* | 1/2003 | Nixon | G05B 19/0426 |
| 2003/0185379 A1* | 10/2003 | O'Connor | H04L 51/56 |
| | | | 379/265.02 |
| 2006/0059235 A1* | 3/2006 | Peterson | G06Q 10/00 |
| | | | 709/206 |
| 2006/0064646 A1* | 3/2006 | Kelso | H04L 51/04 |
| | | | 715/772 |
| 2006/0075029 A1* | 4/2006 | Kelso | H04L 51/04 |
| | | | 709/206 |
| 2006/0282419 A1* | 12/2006 | Sen | G06F 11/3636 |
| 2011/0264689 A1* | 10/2011 | Hirst | G06Q 10/107 |
| | | | 707/769 |
| 2012/0072507 A1* | 3/2012 | Chen | H04L 51/56 |
| | | | 709/206 |
| 2012/0102243 A1* | 4/2012 | Glaeser | G06F 13/28 |
| | | | 710/53 |
| 2012/0144395 A1* | 6/2012 | Bohrer | G06F 9/546 |
| | | | 718/103 |
| 2013/0081063 A1* | 3/2013 | Hosie | G06F 9/52 |
| | | | 719/314 |
| 2013/0097615 A1* | 4/2013 | Falco | G06F 9/546 |
| | | | 719/313 |
| 2013/0198296 A1* | 8/2013 | Roy | G06Q 10/107 |
| | | | 709/206 |
| 2013/0262258 A1* | 10/2013 | Jennings | G06Q 30/0601 |
| | | | 705/26.4 |
| 2014/0096033 A1* | 4/2014 | Blair | H04L 51/56 |
| | | | 715/752 |
| 2014/0143358 A1* | 5/2014 | Beausoleil | H04L 51/063 |
| | | | 709/206 |
| 2014/0222702 A1* | 8/2014 | Jennings | G06Q 30/0631 |
| | | | 705/319 |
| 2014/0245178 A1* | 8/2014 | Smith | H04L 51/216 |
| | | | 715/753 |
| 2014/0310365 A1* | 10/2014 | Sample | G06Q 10/107 |
| | | | 709/206 |
| 2014/0310438 A1* | 10/2014 | Richardson | G06F 9/526 |
| | | | 710/200 |
| 2014/0344369 A1* | 11/2014 | Goldberg | H04L 51/234 |
| | | | 709/206 |
| 2015/0156146 A1* | 6/2015 | Miners | H04L 51/046 |
| | | | 709/206 |
| 2016/0205054 A1* | 7/2016 | Lu | H04L 51/214 |
| | | | 709/206 |
| 2017/0017532 A1* | 1/2017 | Falco | G06F 9/546 |
| 2017/0111305 A1* | 4/2017 | Bastide | H04L 51/52 |
| 2017/0161685 A1* | 6/2017 | Jennings | G06Q 30/0631 |
| 2018/0013714 A1* | 1/2018 | Leach | G06F 16/22 |
| 2018/0295092 A1* | 10/2018 | Peiris | G06Q 50/01 |
| 2018/0373794 A1* | 12/2018 | Dimson | G06N 20/00 |
| 2019/0097964 A1* | 3/2019 | Martinazzi | H04L 51/52 |
| 2019/0102396 A1* | 4/2019 | Pan | H04L 51/52 |
| 2020/0167732 A1* | 5/2020 | Brieskorn | H04L 51/216 |
| 2020/0403951 A1* | 12/2020 | Kapoor | H04L 51/216 |
| 2022/0217106 A1* | 7/2022 | Manas | H04L 63/0428 |
| 2023/0396574 A1 | 12/2023 | Shoham et al. | |

OTHER PUBLICATIONS

"U.S. Appl. No. 18/110,859, Notice of Allowability mailed Aug. 15, 2024", 16 pgs.

"U.S. Appl. No. 18/110,859, Notice of Allowance mailed Jul. 31, 2024", 20 pgs.

"U.S. Appl. No. 18/110,859, Response filed Jul. 10, 2024 to Non Final Office Action mailed May 10, 2024", 16 pgs.

* cited by examiner

AUTOMATICALLY INCREMENTED READ-WATERMARK

CROSS-REFERENCE TO RELATED APPLICATION

This patent application is a continuation of U.S. patent application Ser. No. 18/110,859, filed Feb. 16, 2023, which application claims the benefit of priority to U.S. Provisional Patent Application No. 63/349,848, filed Jun. 7, 2022, entitled "IMAGE BASED VALUATION SYSTEM", both of which are incorporated by reference herein in their entireties.

BACKGROUND

Messages can be transmitted, received, or stored in a variety of electronic formats, including without limitations email, instant or private message (both network-based and peer-to-peer), Short Message Service (SMS), Multimedia Messaging Service (MMS), Visual Voicemail, and the like. For example messages may be transmitted using store- and forward or real-time systems. Several of these message formats, whether by virtue of message size or transmission protocol, can be quickly delivered to recipients, even if relayed using a store-and-forward system. Since participants in electronic communications typically communicate with other participants in remote locations, the immediacy and context of an in-person conversation, such as the implicit knowledge that the other participant in the conversation has heard or received the speaker's communication, may be lost. Accordingly, many of the existing messaging systems provide for some form of proof of delivery, such as tags, watermarks, or read-receipts informing a sender whether or not a message was delivered and/or when the message was opened.

For instance, in the context of a group-messaging session, existing messaging services may provide watermarks or read-receipts to display detailed information on the receiving end for each message within the group messaging session. While effective, these existing methods require frequent database write requests, as well as a significant level of network interaction between devices and accordingly, network bandwidth. As a result, existing methods of displaying read-receipts and watermarks to indicate whether a message has been received by a user can fail.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings in which.

DETAILED DESCRIPTION

Figure 1:
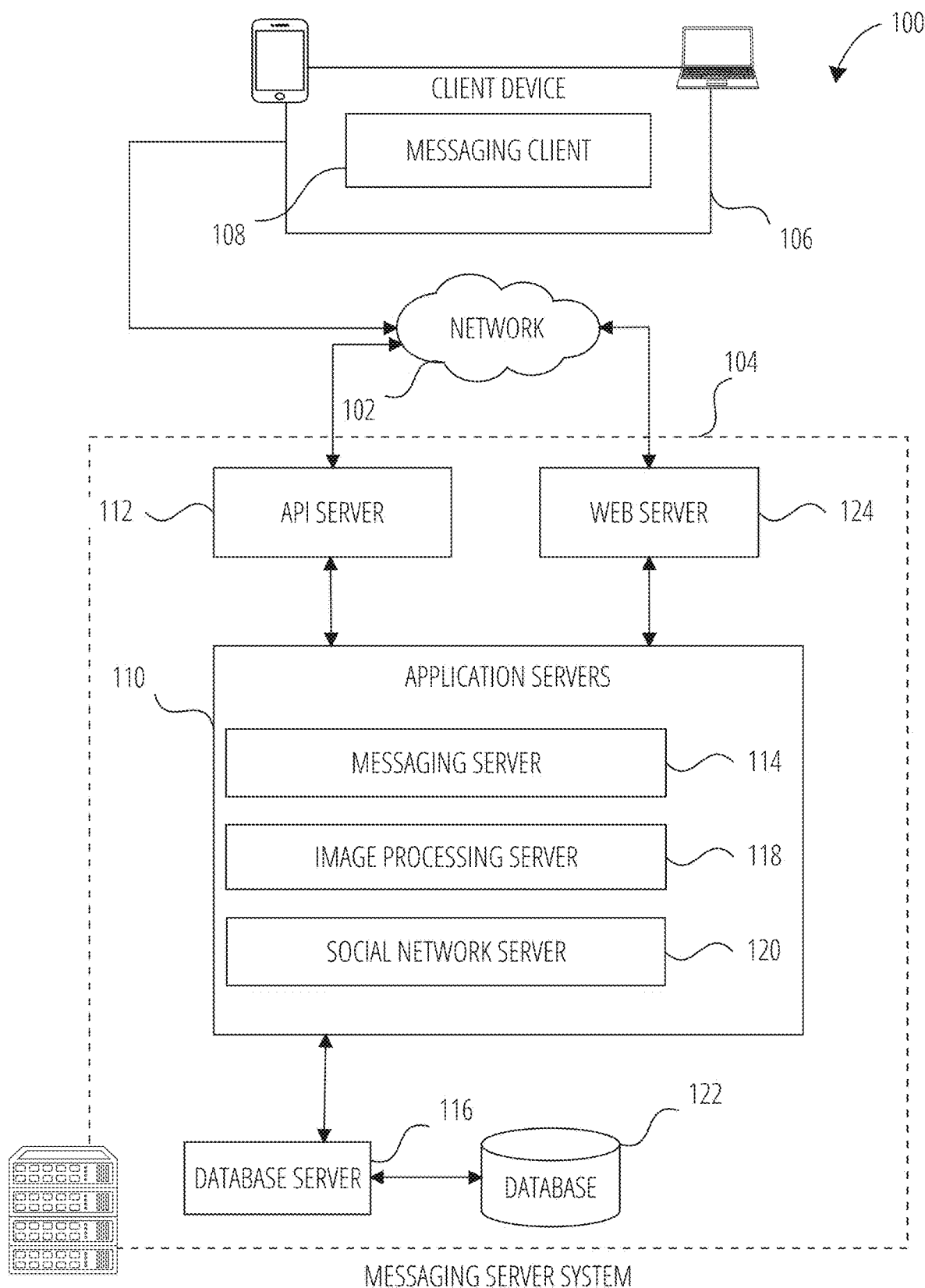
FIG. 1 is a diagrammatic representation of a networked environment in which the present disclosure may be deployed, in accordance with some examples.

As discussed above, existing messaging system may provide a method of presenting watermarks or read-receipts within a group messaging session in order to inform participants of the group messaging session of a current status associated with any given message, such as whether or not the message was delivered or read by one or more participants of the group messaging session. However, these existing systems are often unreliable and prone to failure, due to bandwidth requirements, and a significant level of device interaction. For example, consider the context of an ephemeral messaging system, wherein messages are only displayed for a predefined period of time within a message thread. In such embodiments, a system may be configured to cause the message to disappear after certain conditions are met, such as all users engaged in a messaging session have read/received a message, and a period of time has expired from delivery of the message to all users engage din the messaging session. A problem which may occur in such instances is that a read-watermark may fail as a result of existing inefficiencies with the system, resulting in a message that may remain within a message thread for much longer than the intended period of time. Accordingly, an improved system of determining when to apply a watermark indicating a status of a message within a messaging session is disclosed herein.

Accordingly, in certain embodiments, a system to automatically increment read-watermarks based on a set of predefined rules and criteria is disclosed herein. For example, a system may maintain a database that comprises a plurality of data objects, wherein the plurality of data objects provide: a record of a total number of messages sent within a message thread; an indication of which messages have been read/received by each user engaged in the message thread; and an indication of when a user has sent a new message within the message thread. Accordingly, the system may be configured to perform operations that include: accessing a message thread that comprises a plurality of messages; detecting a display of a message from among the plurality of messages at a client device, the message corresponding with an identification number from among a plurality of sequentially assigned identification numbers associated with the plurality of messages; applying the identification number that corresponds with the message from among the plurality of messages to a data object within a database associated with the message thread, the data object indicating a most recent message read by a user of the client device based on the identification number; detecting a trigger event; and automatically incrementing the identification number associated with the data object within the database responsive to the trigger event.

In some embodiments, the trigger event may include detecting a subsequent message to be included in the message thread. For example, the system may receive a subsequent message to be included in the message thread from the user associated with the client device. Responsive to receiving the subsequent message from the user of the client device, the system may access the database that includes the data object in order to determine what the most recent message read by the user is. Upon determining that the identification number associated with the data object corresponds with a last message sent among the plurality of messages, the system may automatically increment the identification number associated with the data object, to reflect that the subsequent message sent by the user is the most recent message read by the user. By doing so, the system does not need to rely on further requests to the client device associated with the user in order to update the data object.

In some embodiments, the system may display read-watermarks upon messages within the message thread based on the identification numbers associated with data objects within the database. For example, the system may present a display of the subsequent message sent by the user at one or more client devices associated with the message thread, and display the read-watermark to the display of the subsequent message at the one or more client devices based on the identification number associated with the data object within the database.

In some embodiments, the system may maintain a record of a number of messages sent within a message thread, wherein the record may provide an indication of the last message sent in the message thread. Accordingly, by performing a comparison of the identification associated with a user's data object with the record, the system may determine whether or not the user has read/received the most recent message in the message thread.

In some embodiments, the message may include an ephemeral message, wherein the ephemeral message comprises a display duration that defines a period of time in which the message may be displayed. For example, the display duration for any given message may be activated at a client device responsive to determining that a data object associated with the client device reflects an identification number that corresponds with the message. Accordingly, the display duration of an ephemeral message may be activated for a client device based on the identification number associated with the corresponding data object.

Networked Computing Environment

FIG. 1 is a block diagram showing an example messaging system 100 for exchanging data (e.g., messages and associated content) over a network. The messaging system 100 includes multiple instances of a client device 106, each of which hosts a number of applications, including a messaging client 108. Each messaging client 108 is communicatively coupled to other instances of the messaging client 108 and a messaging server system 104 via a network 102 (e.g., the internet).

A messaging client 108 is able to communicate and exchange data with another messaging client 108 and with the messaging server system 104 via the network 102. The data exchanged between messaging client 108, and between a messaging client 108 and the messaging server system 104, includes functions (e.g., commands to invoke functions) as well as payload data (e.g., text, audio, video or other multimedia data).

The messaging server system 104 provides server-side functionality via the network 102 to a particular messaging client 108. While certain functions of the messaging system 100 are described herein as being performed by either a messaging client 108 or by the messaging server system 104, the location of certain functionality either within the messaging client 108 or the messaging server system 104 may be a design choice. For example, it may be technically preferable to initially deploy certain technology and functionality within the messaging server system 104 but to later migrate this technology and functionality to the messaging client 108 where a client device 106 has sufficient processing capacity.

The messaging server system 104 supports various services and operations that are provided to the messaging client 108. Such operations include transmitting data to, receiving data from, and processing data generated by the messaging client 108. This data may include message content, client device information, geolocation information, media augmentation and overlays, message content persistence conditions, social network information, and live event information, as examples. Data exchanges within the messaging system 100 are invoked and controlled through functions available via user interfaces (UIs) of the messaging client 108.

Turning now specifically to the messaging server system 104, an Application Program Interface (API) server 112 is coupled to, and provides a programmatic interface to, application servers 110. The application servers 110 are communicatively coupled to a database server 116, which facilitates access to a database 122 that stores data associated with messages processed by the application servers 110. Similarly, a web server 124 is coupled to the application servers 110, and provides web-based interfaces to the application servers 110. To this end, the web server 124 processes incoming network requests over the Hypertext Transfer Protocol (HTTP) and several other related protocols. In certain embodiments, the database 122 may include a decentralized database.

The Application Program Interface (API) server 112 receives and transmits message data (e.g., commands and message payloads) between the client device 106 and the application servers 110. Specifically, the Application Program Interface (API) server 112 provides a set of interfaces (e.g., routines and protocols) that can be called or queried by the messaging client 108 in order to invoke functionality of the application servers 110. The Application Program Interface (API) server 112 exposes various functions supported by the application servers 110, including account registration, login functionality, the sending of messages, via the application servers 110, from a particular messaging client 108 to another messaging client 108, the sending of media files (e.g., images or video) from a messaging client 108 to a messaging server 114, and for possible access by another messaging client 108, the settings of a collection of media data (e.g., story), the retrieval of a list of friends of a user of a client device 106, the retrieval of such collections, the retrieval of messages and content, the addition and deletion of entities (e.g., friends) to an entity graph (e.g., a social graph), the location of friends within a social graph, and opening an application event (e.g., relating to the messaging client 108).

The application servers 110 host a number of server applications and subsystems, including for example a messaging server 114, an image processing server 118, and a social network server 120. The messaging server 114 implements a number of message processing technologies and functions, particularly related to the aggregation and other processing of content (e.g., textual and multimedia content) included in messages received from multiple instances of the messaging client 108. As will be described in further detail, the text and media content from multiple sources may be aggregated into collections of content (e.g., called stories or galleries). These collections are then made available to the messaging client 108. Other processor and memory intensive processing of data may also be performed server-side by the messaging server 114, in view of the hardware requirements for such processing.

The application servers 110 also include an image processing server 118 that is dedicated to performing various image processing operations, typically with respect to images or video within the payload of a message sent from or received at the messaging server 114.

The social network server 120 supports various social networking functions and services and makes these functions and services available to the messaging server 114. Examples of functions and services supported by the social network server 120 include the identification of other users of the messaging system 100 with which a particular user has relationships or is "following," and also the identification of other entities and interests of a particular user.

System Architecture

Figure 2:
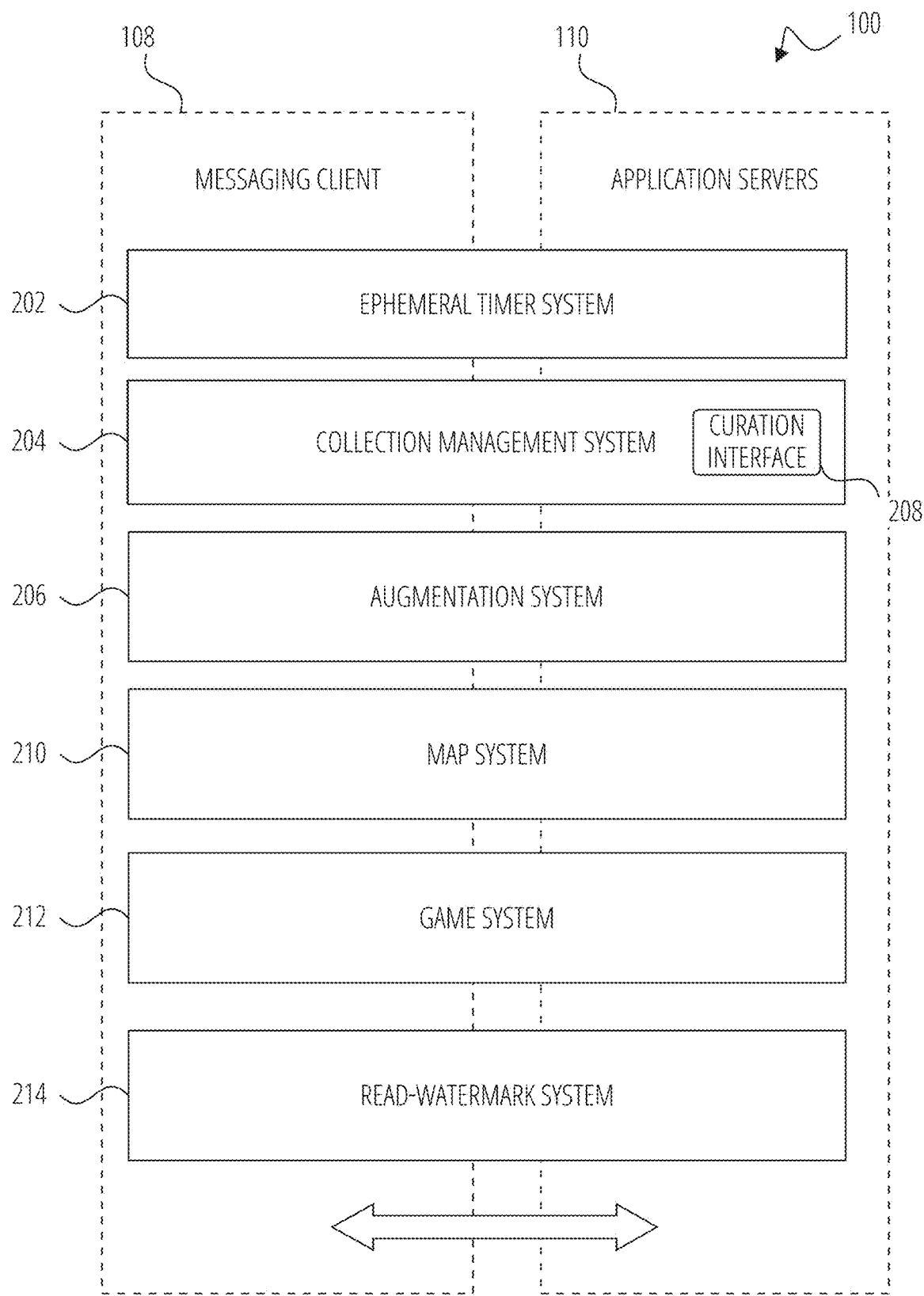
FIG. 2 is a diagrammatic representation of a messaging system, in accordance with some examples, that has both client-side and server-side functionality.

FIG. 2 is a block diagram illustrating further details regarding the messaging system 100, according to some examples. Specifically, the messaging system 100 is shown to comprise the messaging client 108 and the application servers 110. The messaging system 100 embodies a number of subsystems, which are supported on the client-side by the messaging client 108 and on the sever-side by the application servers 110. These subsystems include, for example, an ephemeral timer system 202, a collection management system 204, an augmentation system 206, a map system 210, a game system 212, and a read-watermark system 214.

The ephemeral timer system 202 is responsible for enforcing the temporary or time-limited access to content by the messaging client 108 and the messaging server 114. The ephemeral timer system 202 incorporates a number of timers that, based on duration and display parameters associated with a message, or collection of messages (e.g., a story), selectively enable access (e.g., for presentation and display) to messages and associated content via the messaging client 108. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client 108.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 206 provides various functions that enable a user to augment (e.g., annotate or otherwise modify or edit) media content associated with a message. For example, the augmentation system 206 provides functions related to the generation and publishing of media overlays for messages processed by the messaging system 100. The augmentation system 206 operatively supplies a media overlay or augmentation (e.g., an image filter) to the messaging client 108 based on a geolocation of the client device 106. In another example, the augmentation system 206 operatively supplies a media overlay to the messaging client 108 based on other information, such as social network information of the user of the client device 106. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 106. For example, the media overlay may include text or image that can be overlaid on top of a photograph taken by the client device 106. In another example, the media overlay includes an identification of a location overlay (e.g., Venice beach), a name of a live event, or a name of a merchant overlay (e.g., Beach Coffee House). In another example, the augmentation system 206 uses the geolocation of the client device 106 to identify a media overlay that includes the name of a merchant at the geolocation of the client device 106. The media overlay may include other indicia associated with the merchant. The media overlays may be stored in the database 122 and accessed through the database server 116.

In some examples, the augmentation system 206 provides a user-based publication platform that enables users to select a geolocation on a map and upload content associated with the selected geolocation. The user may also specify circumstances under which a particular media overlay should be offered to other users. The augmentation system 206 generates a media overlay that includes the uploaded content and associates the uploaded content with the selected geolocation.

In other examples, the augmentation system 206 provides a merchant-based publication platform that enables merchants to select a particular media overlay associated with a geolocation via a bidding process. For example, the augmentation system 206 associates the media overlay of the highest bidding merchant with a corresponding geolocation for a predefined amount of time.

The map system 210 provides various geographic location functions, and supports the presentation of map-based media content and messages by the messaging client 108. For example, the map system 210 enables the display of user icons or avatars on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the messaging client 108. A user can furthermore share his or her location and status information (e.g., using an appropriate status avatar) with other users of the messaging system 100 via the messaging client 108, with this location and status information being similarly displayed within the context of a map interface of the messaging client 108 to selected users.

The game system 212 provides various gaming functions within the context of the messaging client 108. The messaging client 108 provides a game interface providing a list of available games that can be launched by a user within the context of the messaging client 108, and played with other users of the messaging system 100. The messaging system 100 further enables a particular user to invite other users to participate in the play of a specific game, by issuing invitations to such other users from the messaging client 108. The messaging client 108 also supports both the voice and text messaging (e.g., chats) within the context of gameplay, provides a leaderboard for the games, and also supports the provision of in-game rewards (e.g., coins and items).

According to certain embodiments, the read-watermark system 214 provides functions that may include: accessing a message thread that comprises a plurality of messages; detecting a display of a message from among the plurality of messages at a client device, the message corresponding with an identification number from among a plurality of sequentially assigned identification numbers associated with the plurality of messages; applying the identification number that corresponds with the message from among the plurality of messages to a data object within a database associated with the message thread, the data object indicating a most recent message read by a user of the client device based on the identification number; detecting a trigger event; and automatically incrementing the identification number associated with the data object within the database responsive to the trigger event.

Figure 3:
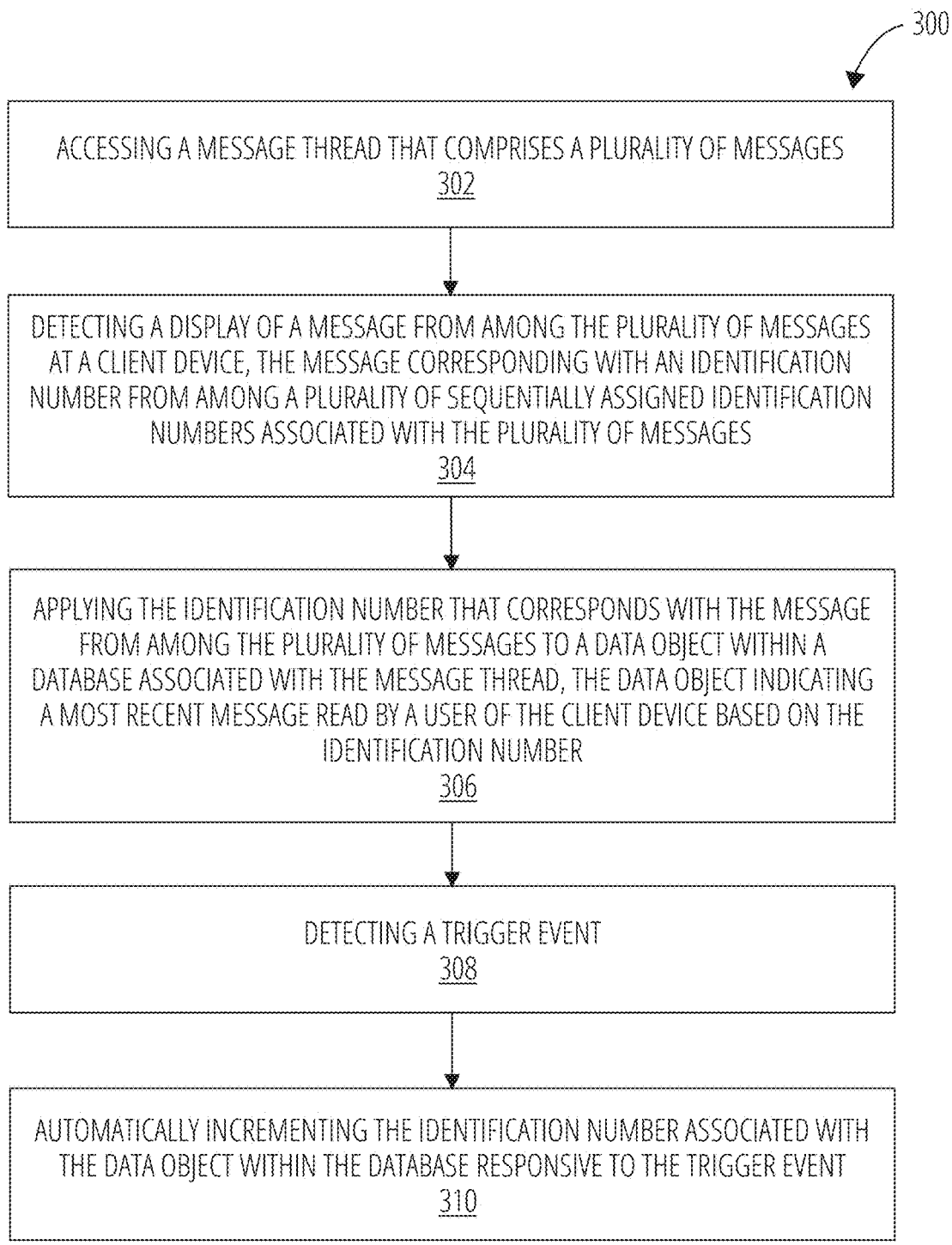
FIG. 3 is a flowchart depicting a method 300 for automatically incrementing a read-watermark, in accordance with one embodiment.

FIG. 3 is a flowchart illustrating operations of a read-watermark system 214 in performing a method 300 for automatically incrementing a read-watermark associated with a user engaged in a messaging session, in accordance with one embodiment. Operations of the method 300 may be performed by one or more subsystems of the messaging system 100 described above with respect to FIG. 2, such as the read-watermark system 214. As shown in FIG. 3, the method 300 includes one or more operations 302, 304, 306, 308, 310 and 312.

At operation 302, the read-watermark system 214 accesses a message thread that comprises a plurality of messages. For example, a user engaged in the message thread may provide a request to the read-watermark system 214 to access the message thread via a client device 106. Responsive to receiving the request, the read-watermark system 214 may generate and cause display of a presentation of the message thread at the client device 106.

At operation 304, the read-watermark system 214 detects a display of a message from among the plurality of messages at the client device 106, wherein the message corresponds with an identification number from among a plurality of sequentially assigned identification numbers associated with the plurality of messages. For example, the message may be a last or most recent message associated with the message thread, and the identification number may reflect that the message is the most recent message in the message thread.

At operation 306, the read-watermark system 214 applies the identification number that corresponds with the message to a data object within a database 122, wherein the database 122 is associated with the message thread, and wherein the data object provides an indication of a most recent message read or otherwise seen by a user of the client device 106, based on the identification number assigned to the data object. Accordingly, by referencing the data object within the database 122, the read-watermark system 214 may be able to identify what message the user of the client device 106 has received/read, and whether or not the user is up to date on the message thread.

At operation 308, the read-watermark system 214 detects a trigger event. Further details of the trigger event are provided in the method 400 depicted in FIG. 4.

At operation 310, the read-watermark system 214 automatically increments the identification number associated with the data object within the database 122, responsive to the trigger event.

Figure 4:
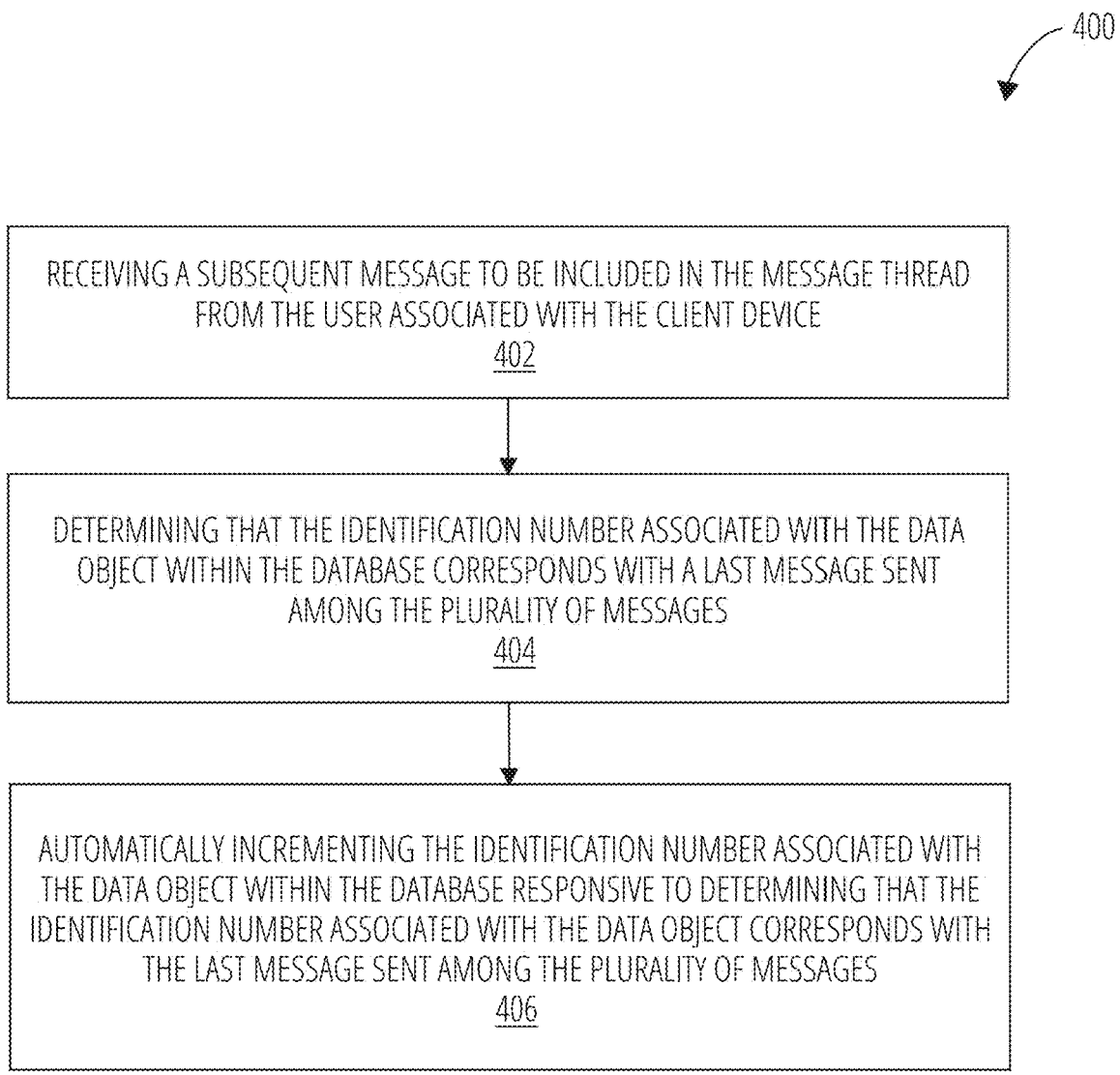
FIG. 4 is a flowchart depicting a method 400 for automatically incrementing a read-watermark, in accordance with one embodiment.

FIG. 4 is a flowchart illustrating operations of a read-watermark system 214 in performing a method 400 for automatically incrementing a read-watermark associated with a user engaged in a messaging session, in accordance with one embodiment. Operations of the method 400 may be performed by one or more subsystems of the messaging system 100 described above with respect to FIG. 2, such as the read-watermark system 214. As shown in FIG. 4, the method 400 includes one or more operations 402, 404, and 406. In some embodiments, the method 400 may be performed as a sub-routine of operations 308 and 310 depicted in the method 300 of FIG. 3.

At operation 402, the read-watermark system 214 receives a subsequent message to be included in the message thread from the user of the client device 106. Responsive to receiving the subsequent message from the user associated with the client device 106, the read-watermark system 214 accesses the database 122 to determine a most recent message read/received by the user of the client device 106.

At operation 404, the read-watermark system 214 determines that the identification number associated with the data object corresponds with a last message sent among the plurality of messages.

Responsive to determining that the identification number associated with the data object corresponds with the last message sent among the plurality of messages, at operation 406, the read-watermark system 214 automatically increments the identification number associated with the data object based on the subsequent message received from the client device 106. Accordingly, the data object may thereby reflect that the user is up to date, and the read-watermark system 214 does not need to make further requests to the client device 106.

Figure 5:
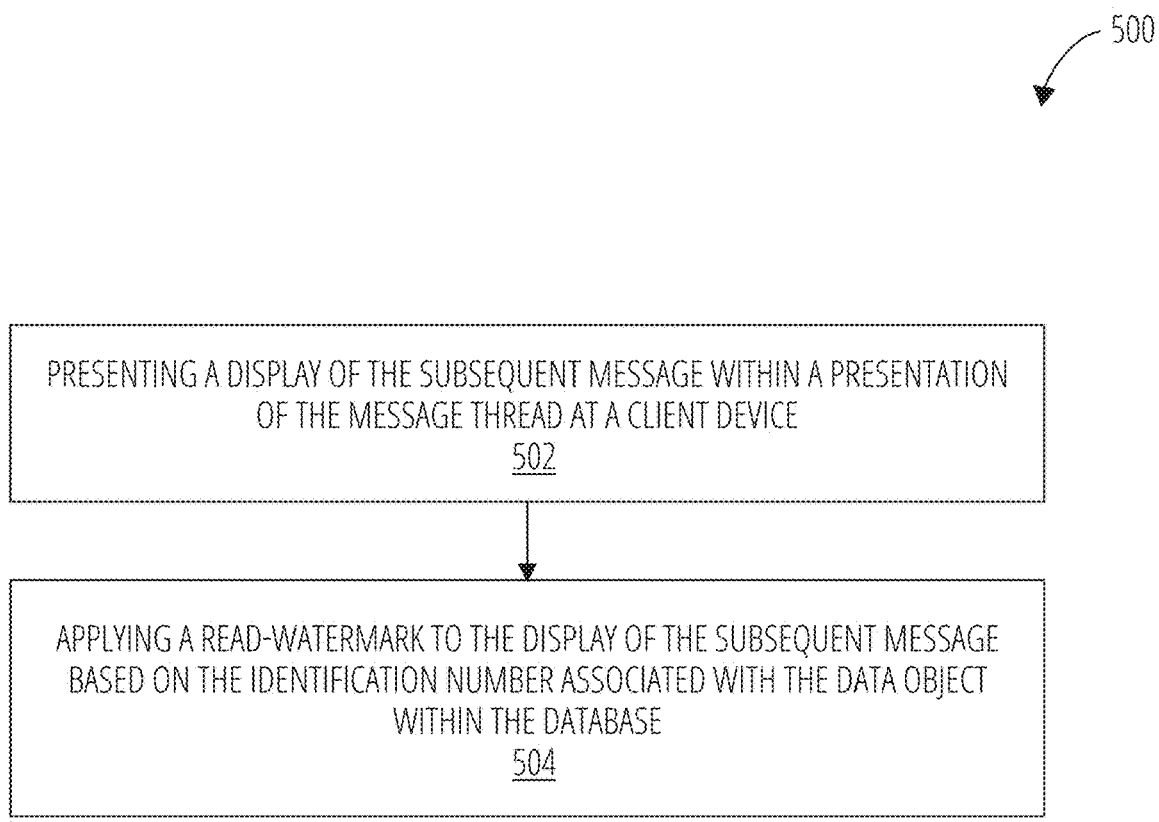
FIG. 5 is a flowchart depicting a method 500 for automatically incrementing a read-watermark, in accordance with one embodiment.

FIG. 5 is a flowchart illustrating operations of a read-watermark system 214 in performing a method 500 for automatically incrementing a read-watermark associated with a user engaged in a messaging session, in accordance with one embodiment. Operations of the method 500 may be performed by one or more subsystems of the messaging system 100 described above with respect to FIG. 2, such as the read-watermark system 214. As shown in FIG. 5, the method 500 includes one or more operations 502 and 504. In some embodiments, the method 500 may be performed as a subroutine of operation 310 of the method 300, or operation 406 of the method 400.

At operation 502, the read-watermark system 214 presents a display of the subsequent message within a presentation of the message thread at a client device.

At operation 504, the read-watermark system 214 applies a read-watermark to the display of the subsequent message based on the identification number associated with the data object within the database 122.

Figure 6:
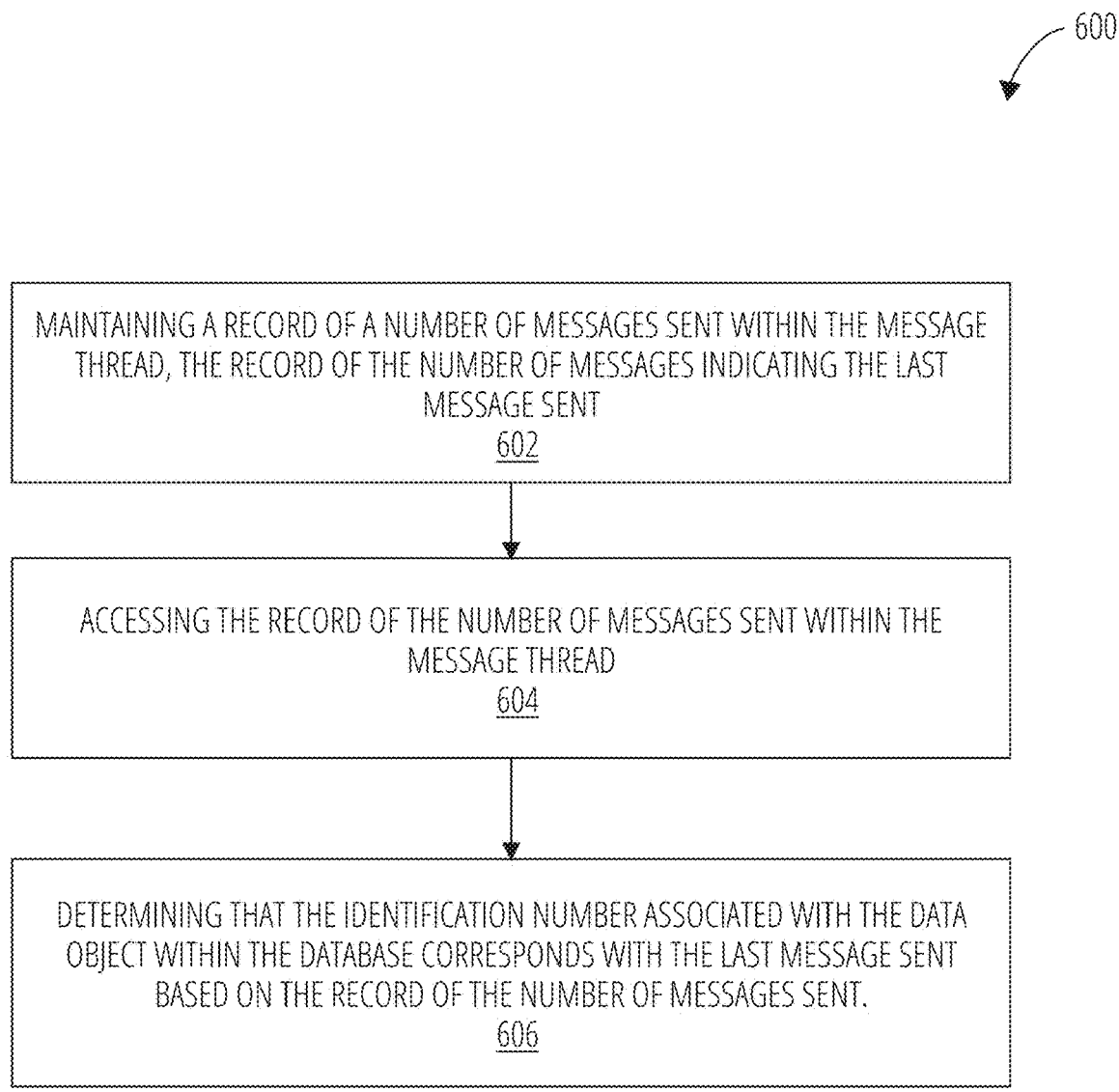
FIG. 6 is a flowchart depicting a method 600 for automatically incrementing a read-watermark, in accordance with one embodiment.

FIG. 6 is a flowchart illustrating operations of a read-watermark system 214 in performing a method 600 for automatically incrementing a read-watermark associated with a user engaged in a messaging session, in accordance with one embodiment. Operations of the method 600 may be performed by one or more subsystems of the messaging system 100 described above with respect to FIG. 2, such as the read-watermark system 214. As shown in FIG. 6, the method 600 includes one or more operations 602, 604, and 606. According to certain embodiments, the method 600 may be performed as a subroutine of operation 404 of the method 400.

At operation 602, the read-watermark system 214 maintains a record of a number of messages sent within a message thread, wherein the record of the number of messages provides an indication of the last message sent within the message thread.

At operation 604, the read-watermark system 214 accesses the record of the number of messages sent within the message thread. For example, the read-watermark system 214 may access the record of the number of messages sent responsive to detecting a trigger event, such as receiving a subsequent message from a user of a client device 106.

At operation 606, the read-watermark system 214 determines that an identification number associated with a data object that corresponds with the user of the client device 106 corresponds with the last message sent in the message thread, as indicated by the record. Accordingly, upon determining that the user has read the most recent message within the message thread, the read-watermark system 214 may increment the identification number associated with the data object responsive to the trigger event.

Machine Architecture

Figure 7:
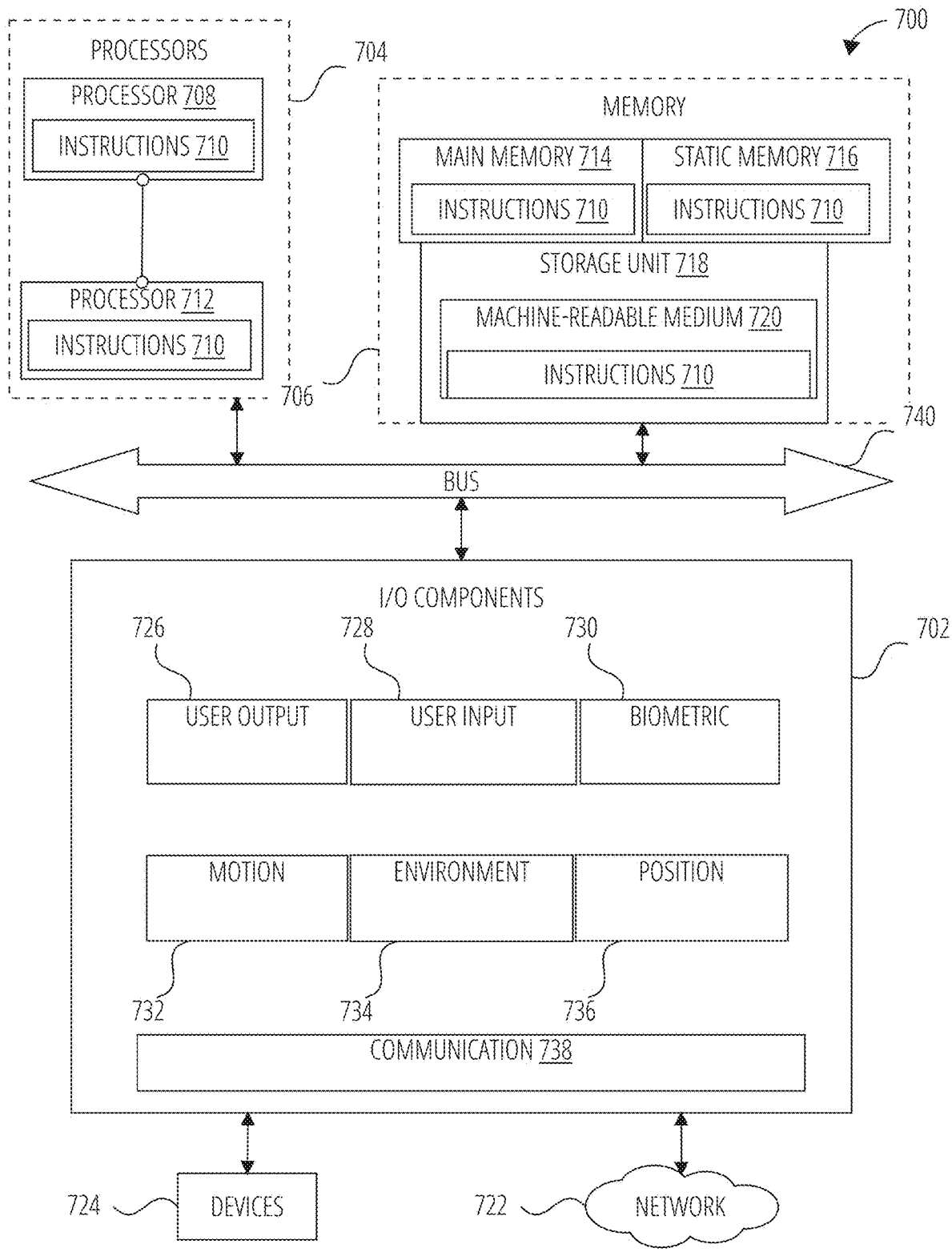
FIG. 7 is a diagrammatic representation of a machine in the form of a computer system within which a set of instructions may be executed for causing the machine to perform any one or more of the methodologies discussed herein, in accordance with some examples.

FIG. 7 is a diagrammatic representation of the machine 700 within which instructions 710 (e.g., software, a program, an application, an applet, an app, or other executable code) for causing the machine 700 to perform any one or more of the methodologies discussed herein may be executed. For example, the instructions 710 may cause the machine 700 to execute any one or more of the methods described herein. The instructions 710 transform the general, non-programmed machine 700 into a particular machine 700 programmed to carry out the described and illustrated functions in the manner described. The machine 700 may operate as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 710, sequentially or otherwise, that specify actions to be taken by the machine 700. Further, while only a single machine 700 is illustrated, the term "machine" shall also be taken to include a collection of machines that individually or jointly execute the instructions 710 to perform any one or more of the methodologies discussed herein. The machine 700, for example, may comprise the client device 106 or any one of a number of server devices forming part of the messaging server system 104. In some examples, the machine 700 may also comprise both client and server systems, with certain operations of a particular method or algorithm being performed on the server-side and with certain operations of the particular method or algorithm being performed on the client-side.

The machine 700 may include processors 704, memory 706, and input/output I/O components 638, which may be configured to communicate with each other via a bus 740. In an example, the processors 704 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 708 and a processor 712 that execute the instructions 710. The term "processor" is intended to include multi-core processors that may comprise two or more independent processors (sometimes referred to as "cores") that may execute instructions contemporaneously. Although FIG. 7 shows multiple processors 704, the machine 700 may include a single processor with a single-core, a single processor with multiple cores (e.g., a multi-core processor), multiple processors with a single core, multiple processors with multiples cores, or any combination thereof.

The memory 706 includes a main memory 714, a static memory 716, and a storage unit 718, both accessible to the processors 704 via the bus 740. The main memory 706, the static memory 716, and storage unit 718 store the instructions 710 embodying any one or more of the methodologies or functions described herein. The instructions 710 may also reside, completely or partially, within the main memory 714, within the static memory 716, within machine-readable medium 720 within the storage unit 718, within at least one of the processors 704 (e.g., within the Processor's cache memory), or any suitable combination thereof, during execution thereof by the machine 700.

The I/O components 702 may include a wide variety of components to receive input, provide output, produce output, transmit information, exchange information, capture measurements, and so on. The specific I/O components 702 that are included in a particular machine will depend on the type of machine. For example, portable machines such as mobile phones may include a touch input device or other such input mechanisms, while a headless server machine will likely not include such a touch input device. It will be appreciated that the I/O components 702 may include many other components that are not shown in FIG. 7. In various examples, the I/O components 702 may include user output components 726 and user input components 728. The user output components 726 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 728 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 702 may include biometric components 730, motion components 732, environmental components 734, or position components 736, among a wide array of other components. For example, the biometric components 730 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 732 include acceleration sensor components (e.g., accelerometer), gravitation sensor components, rotation sensor components (e.g., gyroscope).

The environmental components 734 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 106 may have a camera system comprising, for example, front cameras on a front surface of the client device 106 and rear cameras on a rear surface of the client device 106. The front cameras may, for example, be used to capture still images and video of a user of the client device 106 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 106 may also include a 360° camera for capturing 360° photographs and videos.

Further, the camera system of a client device 106 may include dual rear cameras (e.g., a primary camera as well as a depth-sensing camera), or even triple, quad or penta rear camera configurations on the front and rear sides of the client device 106. These multiple cameras systems may include a wide camera, an ultra-wide camera, a telephoto camera, a macro camera and a depth sensor, for example.

The position components 736 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 702 further include communication components 738 operable to couple the machine 700 to a network 722 or devices 724 via respective coupling or connections. For example, the communication components 738 may include a network interface Component or another suitable device to interface with the network 722. In further examples, the communication components 738 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 724 may be another machine or any of a wide variety of peripheral devices (e.g., a peripheral device coupled via a USB).

Moreover, the communication components 738 may detect identifiers or include components operable to detect identifiers. For example, the communication components 738 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 738, such as location via Internet Protocol (IP) geolocation, location via Wi-Fi® signal triangulation, location via detecting an NFC beacon signal that may indicate a particular location, and so forth.

The various memories (e.g., main memory 714, static memory 716, and memory of the processors 704) and storage unit 718 may store one or more sets of instructions and data structures (e.g., software) embodying or used by any one or more of the methodologies or functions described herein. These instructions (e.g., the instructions 710), when executed by processors 704, cause various operations to implement the disclosed examples.

The instructions 710 may be transmitted or received over the network 722, using a transmission medium, via a network interface device (e.g., a network interface component included in the communication components 738) and using any one of several well-known transfer protocols (e.g., hypertext transfer protocol (HTTP)). Similarly, the instructions 710 may be transmitted or received using a transmission medium via a coupling (e.g., a peer-to-peer coupling) to the devices 724.

Software Architecture

Figure 8:
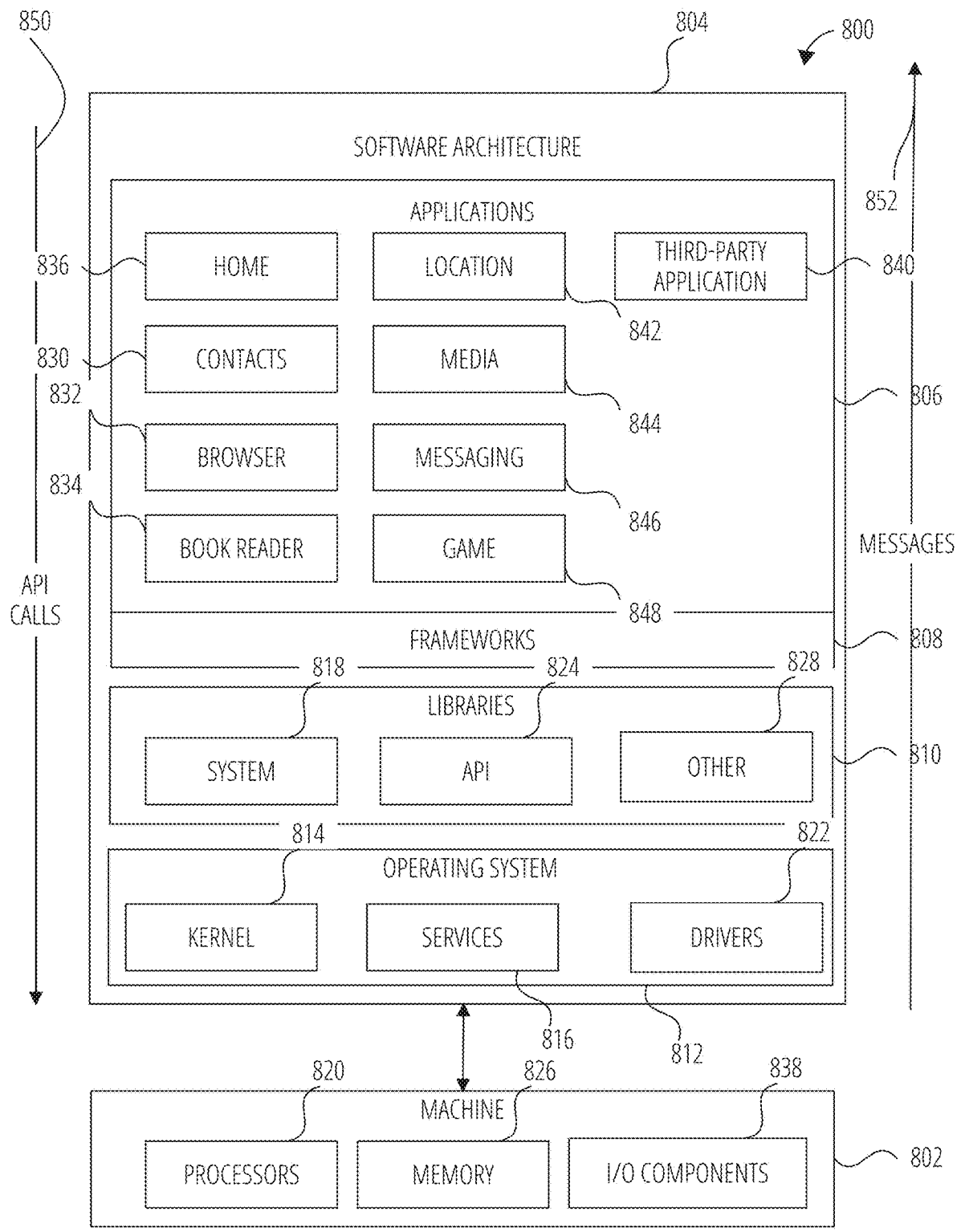
FIG. 8 is a block diagram showing a software architecture within which examples may be implemented.

FIG. 8 is a block diagram 800 illustrating a software architecture 804, which can be installed on any one or more of the devices described herein. The software architecture 804 is supported by hardware such as a machine 802 that includes processors 820, memory 826, and I/O components 838. In this example, the software architecture 804 can be conceptualized as a stack of layers, where each layer provides a particular functionality. The software architecture 804 includes layers such as an operating system 812, libraries 810, frameworks 808, and applications 806. Operationally, the applications 806 invoke API calls 850 through the software stack and receive messages 852 in response to the API calls 850.

The operating system 812 manages hardware resources and provides common services. The operating system 812 includes, for example, a kernel 814, services 816, and drivers 822. The kernel 814 acts as an abstraction layer between the hardware and the other software layers. For example, the kernel 814 provides memory management, processor management (e.g., scheduling), component management, networking, and security settings, among other functionality. The services 816 can provide other common services for the other software layers. The drivers 822 are responsible for controlling or interfacing with the underlying hardware. For instance, the drivers 822 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 810 provide a common low-level infrastructure used by the applications 806. The libraries 810 can include system libraries 818 (e.g., C standard library) that provide functions such as memory allocation functions, string manipulation functions, mathematic functions, and the like. In addition, the libraries 810 can include API libraries 824 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 810 can also include a wide variety of other libraries 828 to provide many other APIs to the applications 806.

The frameworks 808 provide a common high-level infrastructure that is used by the applications 806. For example, the frameworks 808 provide various graphical user interface (GUI) functions, high-level resource management, and high-level location services. The frameworks 808 can provide a broad spectrum of other APIs that can be used by the applications 806, some of which may be specific to a particular operating system or platform.

In an example, the applications 806 may include a home application 836, a contacts application 830, a browser application 832, a book reader application 834, a location application 842, a media application 844, a messaging application 846, a game application 848, and a broad assortment of other applications such as a third-party application 840. The applications 806 are programs that execute functions defined in the programs. Various programming languages can be employed to create one or more of the applications 806, structured in a variety of manners, such as object-oriented programming languages (e.g., Objective-C, Java, or C++) or procedural programming languages (e.g., C or assembly language). In a specific example, the third-party application 840 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 840 can invoke the API calls 850 provided by the operating system 812 to facilitate functionality described herein.

Processing Components

Figure 9:
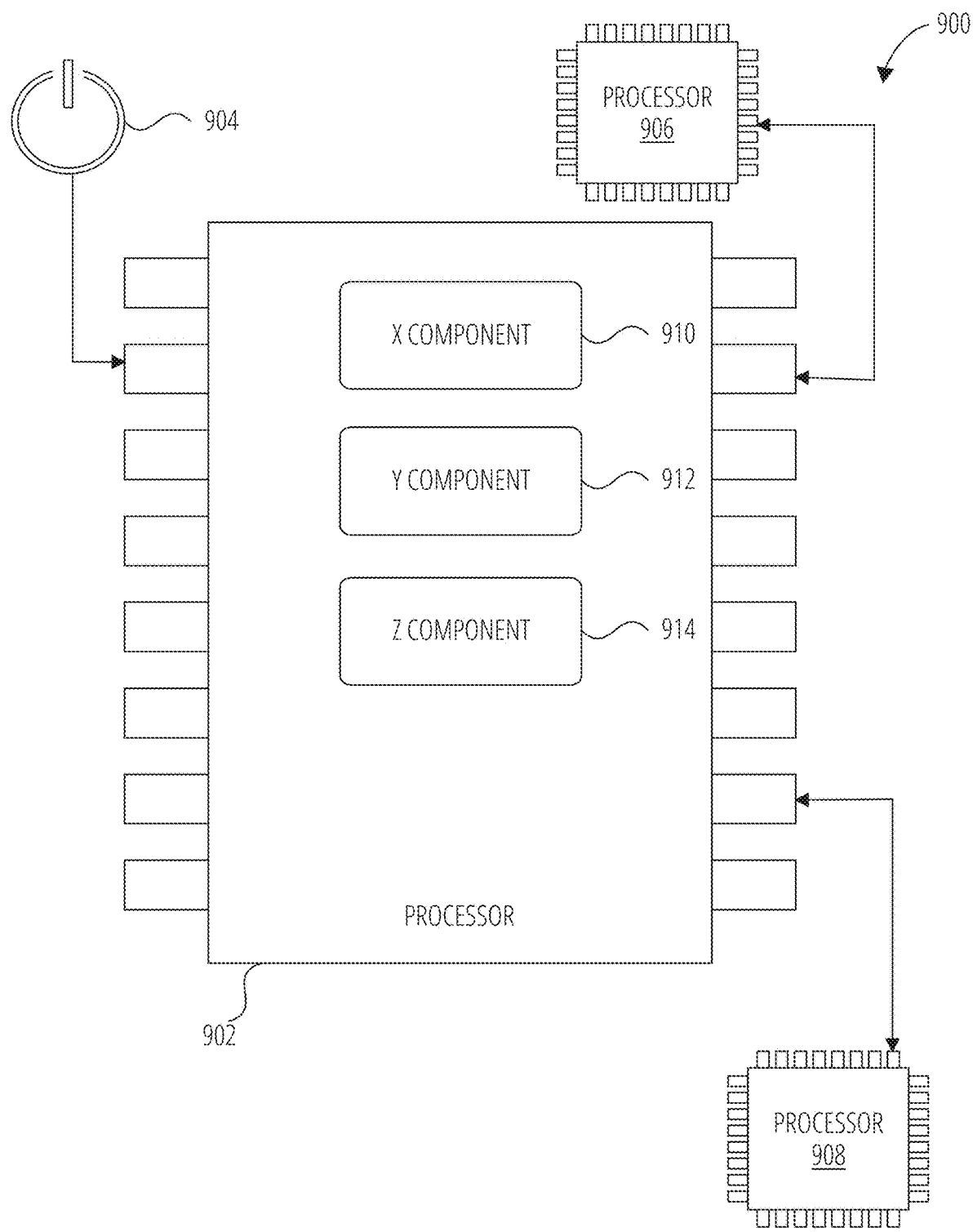
FIG. 9 is a diagrammatic representation of a processing environment, in accordance with some examples.

Turning now to FIG. 9, there is shown a diagrammatic representation of a processing environment 900, which includes a processor 902, a processor 906, and a processor 908 (e.g., a GPU, CPU or combination thereof).

The processor 902 is shown to be coupled to a power source 904, and to include (either permanently configured or temporarily instantiated) modules, namely an X component 910, a Y component 912, and a Z component 914, operationally configured to perform operations as discussed in the method 300 of FIG. 3, and the method 400 (deleted) of FIG. 4 (deleted), in accordance with embodiments discussed herein.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 1004 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A method comprising:
   maintaining, by one or more processors, a database comprising a plurality of data objects, wherein each data object is associated with an identification number and indicates a most recent message displayed at a client device;
   maintaining, by the one or more processors, a record of a number of messages sent within a message thread that comprises a plurality of messages at the client device;
   causing display of the message thread;
   accessing, by the one or more processors, a record of a number of messages sent within the message thread, the record indicating a last message sent within the message thread;
   automatically incrementing the identification number associated with the data object responsive to determining that the identification number corresponds with the last message sent within the message thread;
   updating, by the one or more processors, the record of the number of messages sent;
   transmitting, by the one or more processors, data to one or more client devices associated with the message thread to update a display of a read-watermark to the display of the message thread based on the incremented identification number; and
   presenting a read-watermark at a position within the message thread at one or more client devices associated with the message thread based on the identification number associated with the data object within the database.

2. The method of claim 1, wherein determining that the identification number corresponds with the last message sent within the message thread is based on the record of the number of messages sent.

3. The method of claim 1, wherein the automatically incrementing the identification number associated with the data object includes:
   receiving a subsequent message to be included in the message thread from a user associated with the client device; and
   determining that the identification number associated with the data object within the database corresponds with a last message sent among the plurality of messages.

4. The method of claim 3, further comprising:
   presenting a display of the subsequent message within a presentation of the message thread at a client device; and
   applying the read-watermark to the display of the subsequent message based on the identification number associated with the data object within the database.

5. The method of claim 3, wherein the client device includes a first client device and the method further comprises:
   presenting a display of the subsequent message within a presentation of the message thread at a second client device; and
   applying the read-watermark to the display of the subsequent message at the second client device.

6. The method of claim 3, wherein the subsequent message is an ephemeral message comprising a display duration.

7. A system comprising:
   a memory; and
   at least one hardware processor to perform operations comprising:
   maintaining, by one or more processors, a database comprising a plurality of data objects, wherein each data object is associated with an identification number and indicates a most recent message displayed at a client device;
   maintaining, by the one or more processors, a record of a number of messages sent within a message thread that comprises a plurality of messages at the client device;
   causing display of the message thread;
   accessing, by the one or more processors, a record of a number of messages sent within the message thread, the record indicating a last message sent within the message thread;
   automatically incrementing the identification number associated with the data object responsive to determining that the identification number corresponds with the last message sent within the message thread;
   updating, by the one or more processors, the record of the number of messages sent;
   transmitting, by the one or more processors, data to one or more client devices associated with the message thread to update a display of a read-watermark to the display of the message thread based on the incremented identification number; and
   presenting a read-watermark at a position within the message thread at one or more client devices associated with the message thread based on the identification number associated with the data object within the database.

8. The system of claim 7, wherein determining that the identification number corresponds with the last message sent within the message thread is based on the record of the number of messages sent.

9. The system of claim 7, wherein the automatically incrementing the identification number associated with the data object includes:
   receiving a subsequent message to be included in the message thread from a user associated with the client device; and
   determining that the identification number associated with the data object within the database corresponds with a last message sent among the plurality of messages.

10. The system of claim 9, further comprising:
    presenting a display of the subsequent message within a presentation of the message thread at a client device; and
    applying the read-watermark to the display of the subsequent message based on the identification number associated with the data object within the database.

11. The system of claim 9, wherein the client device includes a first client device and the method further comprises:
presenting a display of the subsequent message within a presentation of the message thread at a second client device; and
applying the read-watermark to the display of the subsequent message at a second client device.

12. The system of claim 9, wherein the subsequent message is an ephemeral message comprising a display duration.

13. A non-transitory machine-readable storage medium comprising instructions that, when executed by one or more processors of a machine, cause the machine to perform operations comprising:
maintaining, by one or more processors, a database comprising a plurality of data objects, wherein each data object is associated with an identification number and indicates a most recent message displayed at a client device;
maintaining, by the one or more processors, a record of a number of messages sent within a message thread that comprises a plurality of messages at the client device;
causing display of the message thread;
accessing, by the one or more processors, a record of a number of messages sent within the message thread, the record indicating a last message sent within the message thread;
automatically incrementing the identification number associated with the data object responsive to determining that the identification number corresponds with the last message sent within the message thread;
updating, by the one or more processors, the record of the number of messages sent;
transmitting, by the one or more processors, data to one or more client devices associated with the message thread to update a display of a read-watermark to the display of the message thread based on the incremented identification number; and
presenting a read-watermark at a position within the message thread at one or more client devices associated with the message thread based on the identification number associated with the data object within the database.

14. The non-transitory machine-readable storage medium of claim 13, wherein determining that the identification number corresponds with the last message sent within the message thread is based on the record of the number of messages sent.

15. The non-transitory machine-readable storage medium of claim 13, wherein the automatically incrementing the identification number associated with the data object includes:
receiving a subsequent message to be included in the message thread from a user associated with the client device; and
determining that the identification number associated with the data object within the database corresponds with a last message sent among the plurality of messages.

16. The non-transitory machine-readable storage medium of claim 15, further comprising:
presenting a display of the subsequent message within a presentation of the message thread at a client device; and
applying the read-watermark to the display of the subsequent message based on the identification number associated with the data object within the database.

17. The non-transitory machine-readable storage medium of claim 15, wherein the client device includes a first client device and the method further comprises:
presenting a display of the subsequent message within a presentation of the message thread at a second client device; and
applying the read-watermark to the display of the subsequent message at a second client device.

* * * * *